US010656885B2

(12) United States Patent
Hamlen (10) Patent No.: US 10,656,885 B2
(45) Date of Patent: May 19, 2020

(54) USING OBJECT FLOW INTEGRITY TO IMPROVE SOFTWARE SECURITY

(71) Applicant: Board of Regents, The University of Texas System, Austin, TX (US)

(72) Inventor: Kevin W. Hamlen, Richardson, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 16 days.

(21) Appl. No.: 16/173,358

(22) Filed: Oct. 29, 2018

(65) Prior Publication Data
US 2020/0117803 A1  Apr. 16, 2020

Related U.S. Application Data

(60) Provisional application No. 62/578,700, filed on Oct. 30, 2017.

(51) Int. Cl.
*G06F 21/62* (2013.01)
*G06F 9/48* (2006.01)
*G06F 3/12* (2006.01)
*G06F 16/17* (2019.01)
*G06K 15/00* (2006.01)

(52) U.S. Cl.
CPC ........ *G06F 3/1222* (2013.01); *G06F 16/1734* (2019.01); *G06F 21/6209* (2013.01); *G06K 15/4095* (2013.01)

(58) Field of Classification Search
CPC .............................. G06F 3/1222; G06F 21/62
USPC ......................................................... 717/130
See application file for complete search history.

(56) References Cited

U.S. PATENT DOCUMENTS

| | | | | |
|---|---|---|---|---|
| 8,399,959 | B2 * | 3/2013 | Vasiliu | ................ H01L 23/5256 257/209 |
| 9,202,044 | B2 | 12/2015 | Hamlen | |
| 2004/0123154 | A1 * | 6/2004 | Lippman | ................. G06F 21/50 726/11 |
| 2014/0282978 | A1 * | 9/2014 | Lerner | .................. H04L 63/083 726/7 |
| 2015/0150142 | A1 * | 5/2015 | Austin | .................. G06F 3/1222 726/26 |
| 2017/0090929 | A1 * | 3/2017 | Muttik | .................. G06F 21/562 |

* cited by examiner

*Primary Examiner* — John Q Chavis (57) ABSTRACT

The present disclosure is directed to a method of creating an object flow integrity (OFI) library module, capable of redirecting an object-like programmatic call, by initiating a multi-pass, recursive process to analyze a module's interfaces, function parameters, and data types. In another aspect, a method is disclosed to modify the binary code of an untrusted module to enable its usage of the OFI library module. In another aspect, during runtime operations of an untrusted module, the OFI library module can receive an object from a caller module, substitute a proxy object, stored in a secure location, and continue the programmatic call using the proxy object.

23 Claims, 7 Drawing Sheets

$\tau ::= \mathcal{U} \mid \bot$ (security-irrelevant byte)
$\mid \tau_1 \times \tau_2$ (structures)
$\mid \tau^s$ (arrays)
$\mid \tau_1 + \tau_2$ (unions)
$\mid C$ (shared object classes)
$\mid \tau \to_{cc} \tau'$ (functions)
$\mid [dir]\tau*$ (pointers)
$\mid \Sigma_{(v:\tau)}f$ (dependent pairs)
$\mid \mu t.\tau \mid t$ (recursive datatypes)

$s ::= n \mid ZT$ (zero-terminated) (array sizes)

$n \in \mathbb{N}$ (numeric constants)

$f : \mathbb{N} \to \mathcal{U}$ (type dependencies)

$dir ::=$ in | out | inout (argument directions)

$cc ::=$ callee_pop | caller_pop (calling conventions)

FIG. 4

510   $\mathcal{E}_x[\![\bot]\!]dp = \{\}$

512   $\mathcal{E}_x[\![\tau_1 \times \tau_2]\!]dp = \mathcal{E}_x[\![\tau_1]\!]dp; \mathcal{E}_x[\![\tau_2]\!]d(p + |\tau_1|)$ 514   $\mathcal{E}_x[\![\tau^n]\!]dp = (n > 0 \Rightarrow (\mathcal{E}_x[\![\tau]\!]dp; \mathcal{E}_x[\![\tau^{n-1}]\!]d(p + |\tau|)))$ 516   $\mathcal{E}_x[\![\tau^{ZT}]\!]dp = (*p \neq 0 \Rightarrow (\mathcal{E}_x[\![\tau]\!]dp; \mathcal{E}_x[\![\tau^{ZT}]\!]d(p + |\tau|)))$ 518   $\mathcal{E}_x[\![\tau_1 + \tau_2]\!]dp = \mathcal{E}_x[\![\tau_1]\!]dp; \mathcal{E}_x[\![\tau_2]\!]dp$ 521   $\mathcal{E}_x[\![\tau \rightarrow_{cc} \tau']\!]dp =$ 1 copy $\tau$ from caller to callee;
522   2 $\mathcal{E}_x[\![\tau]\!](\text{in})(\&\text{callee\_frame});$
523   3 $r := \text{call } p;$
524   4 $\mathcal{E}_{x^{-1}}[\![\tau']\!](\text{out})(\&r);$
525   5 $\mathcal{E}_{x^{-1}}[\![\tau]\!](\text{out})(\&\text{caller\_frame});$
526   6 pop $\tau$ from opposite(cc) stack;
527   7 return $r$ 530   $\mathcal{E}_x[\![[dir]\tau*]\!]dp = ((dir \in \{d, \text{inout}\} \land *p \neq 0) \Rightarrow$
    match $\tau$ with $(\_ \rightarrow \_) \Rightarrow *p := \&((\mathcal{E}_{x^{-1}}[\![\tau]\!](\text{in})(*p)$
    $| C \Rightarrow *p := x(*p)$
    $| \_ \Rightarrow \mathcal{E}_x[\![\tau]\!]d(*p))$ 532   $\mathcal{E}_x[\![\Sigma_{(v:\tau)}f]\!]dp = \mathcal{E}_x[\![\tau]\!]dp; \mathcal{E}_x[\![f(*p)]\!]d(p + |\tau|)$ 534   $\mathcal{E}_x[\![\mu t.\tau]\!]dp = \mathcal{E}_x[\![\tau[\mu t.\tau/t]]\!]dp$

USING OBJECT FLOW INTEGRITY TO IMPROVE SOFTWARE SECURITY

CROSS-REFERENCE TO RELATED APPLICATION

This application claims the benefit of U.S. Provisional Application Ser. No. 62/578,700, filed by Kevin W. Hamlen on Oct. 30, 2017, entitled "USING OBJECT FLOW INTEGRITY TO IMPROVE SOFTWARE SECURITY," commonly assigned with this application and incorporated herein by reference.

GOVERNMENT LICENSE RIGHTS

This invention was made with government support under FA9550-14-1-0173 awarded by Air Force Office of Scientific Research; N00014-14-1-0030 awarded by Office of Naval Research; and CNS1054629 and 1513704 awarded by National Science Foundation. The government has certain rights in the invention.

TECHNICAL FIELD

This application is directed, in general, to a software security process and, more specifically, to a process to enhance software transaction security between untrusted and trusted object-like software modules.

BACKGROUND

Control flow integrity (CFI) and software fault isolation (SFI) secure software against control flow hijacking attacks by confining its flows to a whitelist of permissible control flow edges. The CFI and SFI approaches are appropriate for some types of software attacks, for example, return-oriented programming (ROP) and other code-reuse attacks (CRAs). Attacks in these families exploit dataflow vulnerabilities, e.g., buffer overflows, to corrupt code pointers and thereby redirect control to attacker chosen program subroutines. By validating the impending control flow targets at runtime before it is reached, CFI and SFI (hereinafter CFI/SFI) guards can prevent these attacks.

There remain types of software to which the CFI/SFI technologies are difficult to apply using existing processes. Such limitations stem from many source aware CFI algorithms' need for full source code for the entire software ecosystem, e.g., even for the operating system (OS) kernel, device drivers, and complete runtime system, in order to analyze application control flows. In addition, there can be difficulty in analyzing complex flows, such as GUI interactive, event driven, and component based software applications.

Also, application code that is to be protected by CFI/SFI, can be located within an untrusted or trusted logical application area. Application code that exists within trusted logical application areas, such as, system libraries and other OS modules, typically cannot be modified, and sometimes not examined, by the CFI/SFI process, since they are part of the protected runtime system.

SUMMARY

In one aspect, the disclosure provides a method for improving software security for an object-like software application. In one embodiment, the method for improving includes: (1) redirecting a programmatic call between untrusted and trusted software modules, wherein the programmatic call is from a calling module and is redirected to an OFI library module, (2) substituting, from the programmatic call, a proxy object for a passed object, wherein the proxy object utilizes OFI methods from the OFI library module, (3) utilizing the proxy object in the programmatic call, and (4) dereferencing the proxy object on the programmatic call return path to the calling module.

In another aspect, the disclosure provides a method of initiating OFI. In one embodiment, the method of initiating includes: (1) initiating an OFI process with respect to an untrusted application, (2) modifying the untrusted application's binary code to include OFI handling for object-like programmatic calls between the untrusted application and a trusted application, and (3) creating an OFI module library relating to the untrusted application.

In yet another aspect, the disclosure provides a non-transitory computer readable medium storing instructions that, when executed by a data processing apparatus, perform operations. In one embodiment, the operations include: (1) intercepting an object-like programmatic call between two software modules initiated by a first software module, (2) substituting a passed object from the call with a proxy object, wherein the proxy object utilizes OFI processes, and (3) dereferencing the proxy object on a return programmatic path to the first software module.

BRIEF DESCRIPTION

Reference is now made to the following descriptions taken in conjunction with the accompanying drawing, in which.

DETAILED DESCRIPTION

Securing software application code against an attack is an important security process. Such attacks can take the form of modifying functionality of the code, redirecting a software call to an attacker controlled module, overwriting variables, and other types of attacks. The existing control flow integrity (CFI) and software fault isolation (SFI) processes can help secure software application code. CFI/SFI processes, however, do not directly address object security when the object is passed between application types, such as from an untrusted application to a trusted application. An object is an instance of a class that can include a combination of variables, functions, and data structures. An untrusted application typically executes at a lower privilege level than the computer's operating system (e.g., at user-level), and is obtained from an untrusted source, such as an internet download. An untrusted application, for example, can be an application that provides interaction with a user, such as Windows Notepad or an internet browser. A trusted application typically comes from a trusted source, for example, operating system (OS) components and kernel application code.

One approach for enhancing the security of passed objects has been to secure objects, before the trusted software application code module (hereinafter, module) receives the objects. This approach is not effective when trusted modules retain persistent references to the object, or when their code executes concurrently with the untrusted module. In these cases, verifying the object at the point of exchange does not prevent the untrusted module from subsequently modifying the virtual function table (vtable) pointer to which the trusted module's reference points. Such attacks are herein called COnfused DEputy-assisted Counterfeit Object-Oriented Programming (CODE-COOP) attacks, since they can turn recipients of counterfeit objects into confused deputies who unknowingly invoke policy prohibited code.

Many CFI/SFI systems implement a process to disallow untrusted module access to trusted, object-like, modules to improve security. This process limits such approaches to architectures with few trusted object-like system application programming interfaces (APIs), such as Linux, applications that make little or no use of such APIs, for example, benchmark or command-line utilities, or platforms where the majority of the OS can be rewritten, for example, ChromeOS. The software architectures that are outside of these parameters are typically unsupported or receive incomplete CFI/SFI security. Object-like, as used herein, includes object-oriented programming structures, i.e. like that found in C++ modules, and non-object-oriented programming structures, i.e. like that found in C modules, which can utilize object-like data structures, including data structures that facilitate the exchange of code pointers between interoperating modules. Non-object-oriented programming structures can be used in an object-oriented style, such as by manually defining structures that contain function pointers. The methods, processes, and systems described in this disclosure can be used with object-oriented and non-object-oriented programming structures provided that the structure at the object's binary level resembles an object-like structure, regardless of the programming language used to generate the software code module.

Safely supporting untrusted modules interacting with trusted modules is problematic for CFI/SFI frameworks. For example, method calls, such as to open a file-save dialog box, are located in trusted system library modules. The function entry points are divulged to untrusted modules at runtime within vtables of shared object data structures produced by trusted modules. By default, most CFI/SFI policies block such control flows as indistinguishable from control flow hijacking attacks.

If these edges are whitelisted in the control flow policy graph to permit the execution, a new problem can emerge. For example, the method call to open a file-save dialog box implicitly passes an object reference, called the this pointer. A compromised, untrusted module can therefore pass a counterfeit object, i.e. a different this pointer, to the trusted module, thereby deputizing it to commit control flow violations when the trusted module invokes the object's counterfeit method pointers.

One possible solution to prevent this passing of a counterfeit object is to validate these object references on the untrusted application side at the time they are passed. This can, however, introduce a time of check to time of use (TOCTOU) vulnerability. Since shared trusted module objects are often dynamically allocated in writable memory, a compromised or malicious application can potentially modify the object's vtable pointer or its contents after passing a reference to it to a trusted module. Trusted modules must therefore re-validate all code pointers at time of use to ensure safety. This breaks CFI/SFI's process because it necessitates rewriting the system libraries.

To bridge this gap, this disclosure demonstrates object flow integrity (OFI) processes. OFI is a process for imbuing CFI/SFI processes to provide support for immutable, trusted modules with object-like APIs. OFI facilitates flow of binary objects across trust boundaries in multi-module processes, without modification to trusted modules. To maintain the deployment flexibility of prior CFI/SFI approaches, OFI assumes no access to untrusted modules and trusted modules. OFI assumes that trusted interfaces are documented, such as via public C++ header files or interactive data language (IDL) specifications.

For example, in a Windows 10 environment, with Microsoft Control Flow Guard (MCFG) enabled, it is possible to achieve arbitrary code execution. MCFG is a Visual Studio addition that compiles CFI guard code into indirect call sites. The guards constrain the sites to a whitelist of destinations. Most Windows 10 system libraries are compiled with MCFG enabled so that their call sites are likewise protected, but there exists several that are not protected. For example, in one test installation, there were 329 unprotected system libraries on a clean install of Windows 10, though, the number of unprotected system libraries can vary based on, for example, the build/version of Windows being used and the target installation's configuration. If an attacker can contrive to load an unprotected system library, such as through dynamic link library (dll) injection or by corrupting variables, CODE-COOP attacks become possible. Since Windows services obtain libraries dynamically and remotely on demand, replacement of the 329 libraries with CFI/SFI protected versions may not resolve the security flaw. Universal adoption of MCFG across all software vendors and all module versions would be a prerequisite for fully protecting the software systems. Such, an adoption, however, is unlikely and therefore not a feasible solution to these type of attacks.

Universal adoption of MCFG can also be insufficient because MCFG cannot protect programmatic call returns in component based applications, which are the basis of many code-reuse attacks, such as return oriented programming (ROP) attacks. CFI/SFI systems that do protect returns must likewise universally modify all binary components or suffer the same vulnerability. The existence of at least some uninstrumented modules is a likely scenario in deployment contexts. Hence, the disclosure proposes an alternative approach that augments arbitrary existing CFI/SFI approaches to safely tolerate such modules without demanding write access to system code.

OFI solves the above discussed problems by ensuring that trusted modules, i.e., potential deputies in an attack, do not receive writable code pointers from untrusted, protected callers, such as untrusted, CFI/SFI protected callers. Each time an object flows across an inter-module trust boundary, OFI delivers a substitute proxy object to the callee. OFI can redirect a programmatic call from one module, the calling module, to an OFI process where a proxy object is substituted for the object passed in the calling module's programmatic call. The proxy object can utilize OFI library modules, i.e., mediator methods, which were previously defined. The proxy object can then be passed to the callee module and used within the callee module's execution. When the callee module returns to the caller module, the OFI process replaces the proxy object with the original object.

For example, OFI can employ two kinds of proxies. Floor proxy objects $\lfloor o \rfloor$ are delivered to trusted callees when an untrusted caller attempts to pass them an object o. Floor objects are so-named because higher trust modules see them when "looking down" toward low trust modules. Ceiling proxy objects $\lceil o \rceil$ are delivered to untrusted callees when a trusted caller attempts to pass them an object o. Low trust modules see them when "looking up" toward high trust modules. Functions $\lfloor \cdot \rfloor$ and $\lceil \cdot \rceil$ are inverses, so using the proxy objects $\lfloor \lceil o \rceil \rfloor = \lceil \lfloor o \rfloor \rceil = o$. Thus, if one module passes an object to another, who then passes the object back, the original module receives back the original object, making the OFI proxy process transparent to the modules.

The disclosed OFI processes can include various proxy methods. Proxy methods that mediate low to high calls, i.e. untrusted to trusted modules, followed by high to low returns, i.e. trusted to untrusted modules, are referred to as vaulters. Various OFI embodiments can employ multiple types of vaulters. For example, OFI processes can define three types of vaulters. Direct vaulters are utilized when there is a direct call, statically identifiable, by the untrusted module. Indirect vaulters are utilized when there is a pointer to an object that can be dereferenced. Virtual vaulters (v-vaulter) are similar to the indirect vaulters with the addition that the object references can exist in a table of pointers, i.e. a set of virtual pointers.

Proxy methods that mediate high to low, i.e. trusted to untrusted modules, followed by a low to high return, i.e. untrusted to trusted modules, are referred to as bouncers. Bouncers are utilized when there is a pointer to an object that can be dereferenced. Virtual bouncers (v-bouncer) are similar to the bouncers with the addition that the object references can exist in a table of pointers, i.e. a set of virtual pointers.

At a high level, proxy objects are in-lined reference monitors (IRMs) that wrap and mediate access to the methods of the objects they proxy. When called, their methods (1) enforce control flow and data flow guards that detect and prevent impending CFI/SFI violations, and (2) seamlessly purvey the same services as the object they proxy, whenever this does not constitute an integrity violation. These functionalities are known as IRM soundness and transparency. The soundness property enforced by a proxy object can be formalized as a type based contract derivable from the method's type signature. Transparency is achieved by the proxy's reversion to the original object's programming whenever the contract is satisfied.

When applying OFI processes to binary code without source code, an OFI implementation must decide where to inject guard code that introduces these proxy objects, for example, computed jump instructions at the binary level, whose destinations cannot generally be statically predicted. Injecting guard code that accommodates every possible proxy scenario at every computed jump instruction in the program is likely to introduce unacceptable performance overhead.

To avoid this, OFI processes can employ a lazy, recursive approach to the object proxy process. At object creation points, OFI processes substitute the created objects with proxy objects whose methods are mediators that enforce CFI/SFI guards before falling through to the proxied object's original programming. The mediators recursively introduce a new layer of proxying for potentially insecure objects being passed as arguments. Thus, proxying occurs dynamically, on-demand, as the method is called by the various modules and with various object arguments.

CODE-COOP attacks that attempt to deputize object recipients by corrupting proxy vtables are thwarted by the OFI processes by storing proxy objects entirely within read-only memory. This is possible because proxy objects can be generated without writable data. Some object exchange protocols, such as component object models (COM) and common object request broker architectures (CORBA), require object recipients to access data via accessor methods, while the object's creator can access in-memory data fields directly. Thus, OFI proxies consist of a fixed vtable and no data.

To avoid overhead associated with dynamically allocating proxy objects, the OFI process can assign proxy objects the same vtable. This allows the entire proxy object pool to be implemented as a single, read-only physical page of memory, which itself can be allocated or copied to multiple virtual pages, with the shared vtable's address.

Multiple physical pages of memory can be utilized as well by the OFI processes. Each such vtable pointer constitutes a complete proxy object, ready to be used as a proxy during the OFI process. The vtable methods call a central dispatcher method that consults the call stack to determine which proxy object and virtual method is the desired destination, and invokes the appropriate mediator implementation.

Another benefit of this proxy object representation strategy is its accommodation of sub-classing relationships. Callees, with formal parameters of type $C_0$, can receive actual arguments of a subtype $C_1 <: C_0$, where $C_1$ is a subtype of $C_0$. Callers expecting return values or out arguments of type $C_0$ can receive objects of various subtypes $C_1 <: C_0$. Proxy objects should obey a corresponding subtyping relation that satisfies $C_1 <: C_0 \Rightarrow (\lfloor C_1 \rfloor <: \lceil C_0 \rceil) \wedge (\lceil C_1 \rceil <: \lfloor C_0 \rfloor)$ in order to preserve computations that depend on subtyping.

At the binary level, object vtables support inheritance. Ordering method pointers from most to least abstract class allows code expecting a more abstract class to transparently access the prefix of the vtable that is shared among its subclasses. Instantiating proxy objects with a shared, fixed vtable therefore allows proxy objects to transparently subtype other proxy objects, since their vtables are identical. This avoids introducing and consulting runtime typing information for the object, which can lead to additional overhead related to protecting that information from malicious tampering.

In order to reliably synthesize and interpose OFI process mediation logic into trust boundary crossing method calls, in some embodiments OFI processes must base its mediation on a description of the interface that links the communicating modules. Since interfaces are collections of method type signatures, OFI processes can therefore enforce a type based contract between caller and callee. That is, the trusted interface method's type signature encodes a set of contractual obligations on code pointers that can be enforced by OFI processes to ensure CFI/SFI compliant operation.

This disclosure also demonstrates that the OFI processes can generate the interfaces for the passed objects automatically, such as with a reflective C++ programming process, though various programming languages and tools can be utilized. When trusted interfaces are specified in a machine readable format, mediator implementations for them can be automatically synthesized from callee type signatures. Such automation is beneficial when interfaces comprise a significant number of methods.

The OFI interface process can use compilers, or other suitable applications, to interpret interface documenting header files, and then using the resultant information to automatically synthesize OFI library modules, i.e., mediator library code. Compilers of various types can be used for this process. The OFI interface process achieves static reflective programming without modifying the compiler, language, or header files. The OFI interface process, as further described herein, uses a C++ compiler to provide the examples and demonstrations, though various languages and tools can be used. The OFI interface process is a program that # includes interface headers, and then reflects over itself to inspect function prototypes, structures, and their types. To achieve reflection on structures, which is not supported by C++, the program reads its own symbol file in a multi-pass compilation.

The interface header, list of exported functions, dumped from the trusted library's export table, and OFI interface process source code can be first compiled to produce a debug symbol file, for example, a program database (PDB) file. A reflector tool can then be employed to parse the symbol file to produce C++ templates that facilitate access to the static types of the constituent structure and class members. By including the resulting templates into a second compilation pass, the OFI interface process reflects upon itself and synthesizes the source code for appropriate mediator code, i.e., the various vaulters and bouncers. A third compilation pass applied to this synthesized mediator code yields the final OFI library module, i.e., mediator library.

The OFI process can include an attacker model which assumes that original, untrusted modules can be completely malicious, containing arbitrary native code, but that they have been transformed by CFI/SFI into code compliant with the control flow policy. The transformed code monitors and constrains security relevant API calls and their arguments as long as control flow stays within a sandbox. Malicious applications must therefore first escape the control flow sandbox before they can abuse system APIs to do damage.

OFI processes can block escape attempts that abuse call sites in immutable modules that depend on objects or code pointers supplied by instrumented modules. The disclosed OFI processes thereby extend whatever policy is enforced by the underlying CFI/SFI mechanism to those call sites. In order to defeat CODE-COOP attacks, the underlying CFI/SFI must therefore enforce a COOP-aware policy for OFI processes to extend.

CFI/SFI control flow policies typically consist of a graph of whitelisted control flow edges that is consulted and enforced by CFI/SFI guard code before the control flow transfer from untrusted modules. In some embodiments, OFI processes require that this graph omit edges directly from low to high trust modules and that these edges be replaced with edges into OFI's proxy pools, to afford OFI processes complete mediation of such transfers.

A facility for read-only, static data, is beneficial for OFI processes to maintain tamper proof proxy objects. This can be achieved by leveraging CFI/SFI to restrict untrusted access to the system's virtual memory API. Untrusted modules are not permitted to enable write access to OFI process owned data or code pages.

To prevent untrusted modules from directly tampering with trusted modules' data, some form of memory isolation is beneficial. CFI/SFI achieves this by sandboxing memory writes by untrusted modules. CFI/SFI leverages control flow guards to enforce atomic blocks, i.e., completes its actions in a single step relative to other threads, which guard memory writes.

Data fields of shared objects can conservatively be treated as private wherein non-owners must access shared object data via accessor methods. This is standard for interfaces that support computing contexts where object locations cannot be predicted statically, such as in distributed computations, including COM interfaces. This affords the accessor methods an opportunity to dynamically fetch or synchronize requested data fields when they are not available locally.

OFI processes are designed to need almost no persistent, writable data of its own, thereby reducing the need to protect such data within address spaces shared by OFI libraries with malicious modules. In multi-threaded processes, OFI processes can conservatively stores its temporary data in CPU registers or other secured, thread local, storage spaces.

There are three general situations where the temporary data can be stored by a different method. (1) If the control flow policy is dynamic, such as if new edges become whitelisted during dynamic linking, then OFI processes can utilize a secure place to store the evolving policy graph. This is typically covered by the underlying CFI/SFI's self-integrity enforcement mechanisms.

(2) A hash table associating objects with their proxies can be beneficial, in order to compute inverses $\lfloor [\bullet] \rfloor$ and $\lceil [\bullet] \rceil$. This can be confined to dedicated memory pages, admitting the use of efficient, OS level memory protections. For example, on Windows desktop OSes, a shared memory mapping, to which a separate memory manager process has write access, can be allocated, and to which the untrusted process has read-only access. OFI library modules residing in untrusted processes can use remote procedure calls (RPC) to write to the hash table. CFI/SFI protections prevent untrusted modules from accessing the RPC API to perform counterfeit writes.

(3) To prevent double-free attacks, in which an untrusted module improperly frees objects held by trusted modules, object proxies maintain reference counts independent from the objects they proxy. When the proxy is first created, the OFI process increments the proxied object's reference count by one. Thereafter, acquisitions and releases of the proxy are not reflected to the proxied object; they affect the proxy object's reference count. When the proxy's reference count reaches zero, it decreases the proxied object's reference count by one and frees itself. Proxy object reference counters are stored within the secure hash table entries to prevent tampering.

Aside from adjusting the control flow policy to incorporate OFI mediation, OFI extensions inhabit the policy enforcement library portion of the architecture. Thus, no change to the disassembly, rewriting, verification, or linking stages is needed. This indicates that OFI process can be implemented in a modular fashion that does not significantly affect the underlying CFI/SFI system's internals.

As noted above, the OFI processes can include various proxy methods. Listings representing subroutine embodiments of the proxy methods are presented below.

| Listing 1 | |
|---|---|
| 1-1 | void VaultDispatch( ) { |
| 1-2 | _asm pop eax |
| 1-3 | PROLOGUE // create secure stack frame |
| 1-4 | _asm mov ret_addr, eax |
| 1-5 | index = (trampoline_pool_base - ret_addr) / TRAMPOLINE_SIZE; |
| 1-6 | vaulter_addr = get_vaulter(index); |
| 1-7 | _asm mov eax, vaulter_addr |

| | Listing 1 |
|---|---|
| 1-8 | EPILOGUE // pop secure stack frame |
| 1-9 | _asm jmp eax |
| 1-10 | } |

Listing 1 presented above is directed to a vault dispatch or vault subroutine according to the principles of the disclosure. In Listing 1, the index of the calling module is first computed from the return address passed by the trampoline to the dispatcher (lines 1-2 to 1-5). The process allocates one trampoline, i.e. indirect jump vectors or memory locations holding pointer addresses, in the pool for the non-virtual, trusted callee permitted as a jump destination by the policy. A virtual trampoline (v-trampoline) can also be utilized, with some additional code, if there is a table of pointers. If the programmatic call is initiated by a trusted module, instead of a trampoline, a chute can be used, or similarly, a virtual chute (v-chute). Functionally, a chute is similar to that of a trampoline. The difference between a trampoline and a chute is maintained in this disclosure to assist in identifying the direction of the programmatic call; the functionality remains similar.

The index unambiguously determines the correct vaulter for the desired callee (line 1-6). No CFI/SFI guards are needed because CFI/SFI guard code in-lined into the untrusted call site has already constrained the flow to a permissible trampoline. Finally, the dispatcher tail-calls the vaulter (line 1-9).

The implementation enforces the control flow policy in four steps: (1) CFI/SFI guard code at the call site ensures that the call can target trampolines assigned to permissible trusted callees. (2) The dispatcher implementation calls the vaulter that mediates the CFI/SFI validated callee. (3) The vaulter implementation enforces the callee's OFI contract and exclusively calls the callee it guards. (4) The trusted callee never receives caller writable object vtables. It receives immutable proxy objects whose methods re-validate call destinations at time of callback. This secures the trusted callee against attacks that try to corrupt or replace the underlying object's vtable.

| | Listing 2 |
|---|---|
| 2-1 | void VVaultDispatch() { |
| 2-2 | _asm pop ecx |
| 2-3 | _asm may eax, [esp+4] |
| 2-4 | PROLOGUE // create secure stack frame |
| 2-5 | _asm mov ret_addr, ecx |
| 2-6 | _asm mov ceiling_proxy_object, eax |
| 2-7 | index = (vtrampoline_pool_base - ret_addr) / TRAMPOLINE_SIZE; |
| 2-8 | trusted_object = floor(ceiling_proxy_object); |
| 2-9 | if (!trusted_object) security_violation( ); |
| 2-10 | v_vaulter = get_v_vaulter(ceiling_proxy_object, index); |
| 2-11 | _asm mov eax, trusted_object |
| 2-12 | _asm mov [ebp+8], eax |
| 2-13 | _asm mov eax, v_vaulter |
| 2-14 | EPILOGUE // pop secure stack frame |
| 2-15 | _asm jmp eax |
| 2-16 | } |

Referring to Listing 2, dispatching virtual calls is similar to the above vault dispatch and also has additional steps. The caller provided this pointer is retrieved along with the trampoline index (lines 2-3 and 2-6). Since the destination is a vaulter, valid this pointers are always ceiling proxy objects. The OFI process applies the floor mapping (⌊•⌋) to recover a reference to the trusted function it proxies (line 2-8). If this fails, a counterfeit object is detected, so the OFI process aborts with a security violation (line 2-9). Otherwise the correct vaulter is computed from the ceiling proxy and the index (line 2-10), the callee's this pointer is replaced with the proxied object (lines 2-11-2-12), and the vaulter is tail-called (line 2-15).

Dispatching non-virtual flows from trusted to untrusted modules is analogous to the vault dispatching procedure, except that the dispatcher targets bouncers rather than vaulters, and indexes the chute pool rather than the trampoline pool. In this context, bouncers are similar to vaulters and chutes are similar to trampolines except that a bouncer and chute are used in a direction from a trusted module to an untrusted module, while a trampoline and vaulter are used from an untrusted module to a trusted module (see FIG. 3). The callee provided return address is also replaced with the address of OFI's return trampoline, so that it can mediate the return.

Dispatching virtual calls from trusted to untrusted modules is analogous to the bouncer dispatching procedure, except that the child is passed a vtable index rather than a callee entry point address. An extra step is needed within the implementation to recover the correct callee method address from the this pointer's vtable. The result is re-validated at the time of runtime call to block CODE-COOP attacks.

Whenever the trusted caller goes through a bouncer to an untrusted callee, the bouncer creates a new stack in which the return address targets OFI's return trampoline. CFI/SFI guards for inter-module return instructions must therefore permit flows to the return trampoline in place of the validated return address. For example, if the underlying CFI/SFI system enforces return flows via a shadow stack, the OFI process validates the return address on the shadow stack, and then allows returning to the return trampoline. The return trampoline flows to the "up" half of the bouncer mediator, which returns to the CFI/SFI validated return address stored on the shadow stack. This is the piece of OFI's implementation that requires explicit cooperation from the underlying CFI/SFI implementation.

| | Listing 3 |
|---|---|
| | Untrusted Module |
| 3-1 | CoCreateInstance(clsid), . . . ,⟨iid1⟩, &o1); |
| 3-2 | o1 → Show(. . .); |
| | Trusted Module |
| 3-3 | o1 → QueryInterface(iid2), &o2); |
| 3-4 | o2 → GetOptions(. . .); |
| 3-5 | o2 → Release( ); |
| 3-6 | o1 → GetResult(&o3); |
| 3-7 | o3 → GetDisplayName(. . .) |
| 3-8 | o3 → Release( ); |
| 3-9 | o1 → Release( ); |

Listing 3 provided above illustrates an example application code outline demonstrating an untrusted to trusted application method call. Listing 3 presents typical C++ code for creating a standard file-open dialog box on a COM based OS, such as Windows. The untrusted application code first creates a shared object o1 (line 3-1), where ⟨clsid⟩ and ⟨iid1⟩ are global numeric identifiers for the system's OpenFileDialog class and IOpenFileDialog interface of that class, respectively. Method Show is then invoked to display the dialog (line 3-2). While executing Show, the trusted system module separately manipulates object o1, including calling its QueryInterface method to obtain a new interface o2 for the object, and invoking its methods (lines 3-3-3-5). Once the user has finished interacting with the dialog and it closes, the untrusted module calls o1's GetResult method to obtain an IShellItem interface o3 whose GetDisplayName method discloses the user's file selection (lines 3-6-3-7). Finally, the untrusted module releases the shared objects (lines 3-8-3-9).

For example, the OFI process transforms line 3-6 so that [o1]→GetResult points to mediator method GetResult_vaulter, whose implementation calls o1→GetResult with this pointer equal to ⌊[o1]⌋=o1. When control returns to the mediator, it replaces out-argument o3 with ⌈o3⌉ and then returns to the untrusted caller.

Listing 4

| | |
|---|---|
| 4-1 | LPCTSTR IpFileName = TEXT("dnscmmc.dll"); |
| 4-2 | HMODULE hModule; |
| 4-3 | IUnknown *o1; |
| 4-4 | HRESULT(WINAPI *IpGC0)(REFCLSID, REFIID, LPVOID*); |
| 4-5 | // other code executed here |
| 4-6 | hModule = LoadLibrary(IpFileName); |
| 4-7 | (FARPROC&) IpGC0 = GetProcAddress(hModule, "DllGetClassObject"); |
| 4-8 | IpGC0(⟨cIsid⟩,⟨iid⟩, (LPVOID*) &o1); |
| 4-9 | // other code executed here |
| 4-10 | // ... code containing a data corruption vulnerability ... |
| 4-11 | // other code executed here |
| 4-12 | IUnknown *o2; |
| 4-13 | o1 → QueryInterface⟨iid2⟩, (LPVOID*) &o2); |

Listing 4 illustrates an example application demonstrating potential data corruption vulnerability. Listing 4 demonstrates the danger with a common Windows COM programming idiom that is vulnerable to CODE-COOP attack even with CFI/SFI protections enabled for application provided modules. Lines 4-6-4-8 dynamically load a COM library, such as dnscmmc.dll, and invoke its DllGetClassObject function to obtain an object reference o1. Line 4-13 obtains a new interface o2 to the object.

Data corruption vulnerability, such as a buffer overwrite, in line 4-10 can potentially allow an attacker to replace o1's vtable with a counterfeit one. CFI/SFI protections guarantee that line 4-13 nevertheless targets a valid QueryInterface implementation, and if the process address space contains a system COM library that has not undergone CFI/SFI instrumentation, the attacker can redirect line 4-13 to an unguarded QueryInterface. Since QueryInterface implementations internally call other methods on o1, for example, AddRef, the attacker can corrupt those to redirect control arbitrarily.

Figure 1:
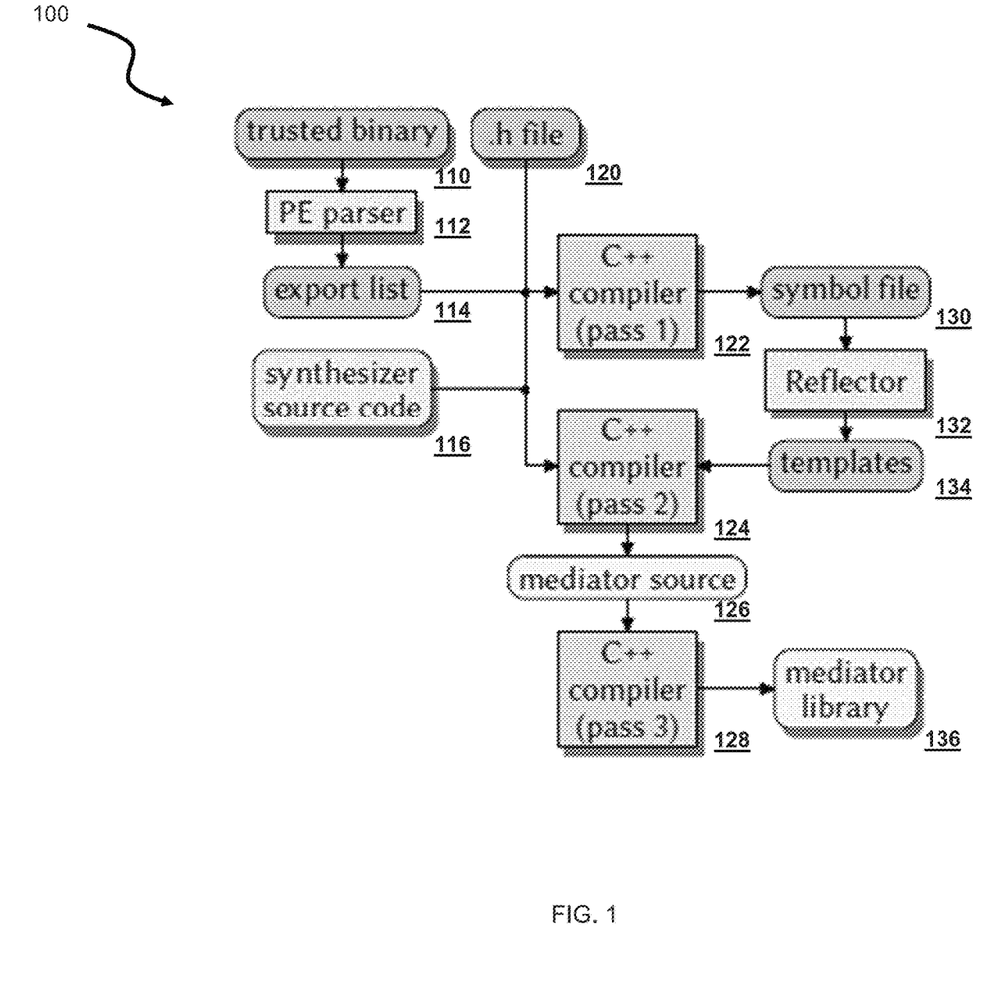
FIG. 1 illustrates a diagram of an example process to automatically generate object flow integrity (OFI) library modules, i.e. mediator libraries.

Turning now to the figures, FIG. 1 illustrates a diagram of an example process 100 to automate the creation of OFI library modules, i.e., mediator libraries. When trusted interfaces are specified in a machine readable format, mediator implementations for them can be automatically synthesized from callee type signatures. Such automation is beneficial when interfaces comprise a significantly large number of methods.

Process 100 demonstrates the use of compilers to interpret interface documenting header files, using the resultant information to automatically synthesize mediator library code. Process 100 uses C++ compilers as an example, though, various types of compilers and other applications, for various programming languages, can be used for this process. In addition, process 100 uses a Windows OS as the example, though various OSes can be utilized, for example, iOS, Android variants, and Unix/Linux variants.

Process 100 begins by identifying the trusted module's binary files 110. A parser 112, such as a portable executable (PE) parser, can be utilized to analyze the trusted binary files 110. Then the export list 114 is created by reading the trusted module's export table.

Process 100 continues to the first compilation pass 122 using the resultant information from the export list 114 and the information from the header file 120 of the trusted module. A debug symbol file 130, such as PDB file, is generated from the compilation pass 122. The process 100 includes a reflector 132 process that can parse the symbol file 130 to produce templates 134, such as C++ templates, that facilitate access to the static types of constituent structure and class members.

Process 100 continues to a second compilation pass 124, where the templates can be utilized to generate the mediator source code 126, i.e., the vaulters and bouncers processes. A third compilation pass 128 can then be applied to the mediator source code 126 to yield the final OFI library module, i.e., mediator library 136.

Figure 2:
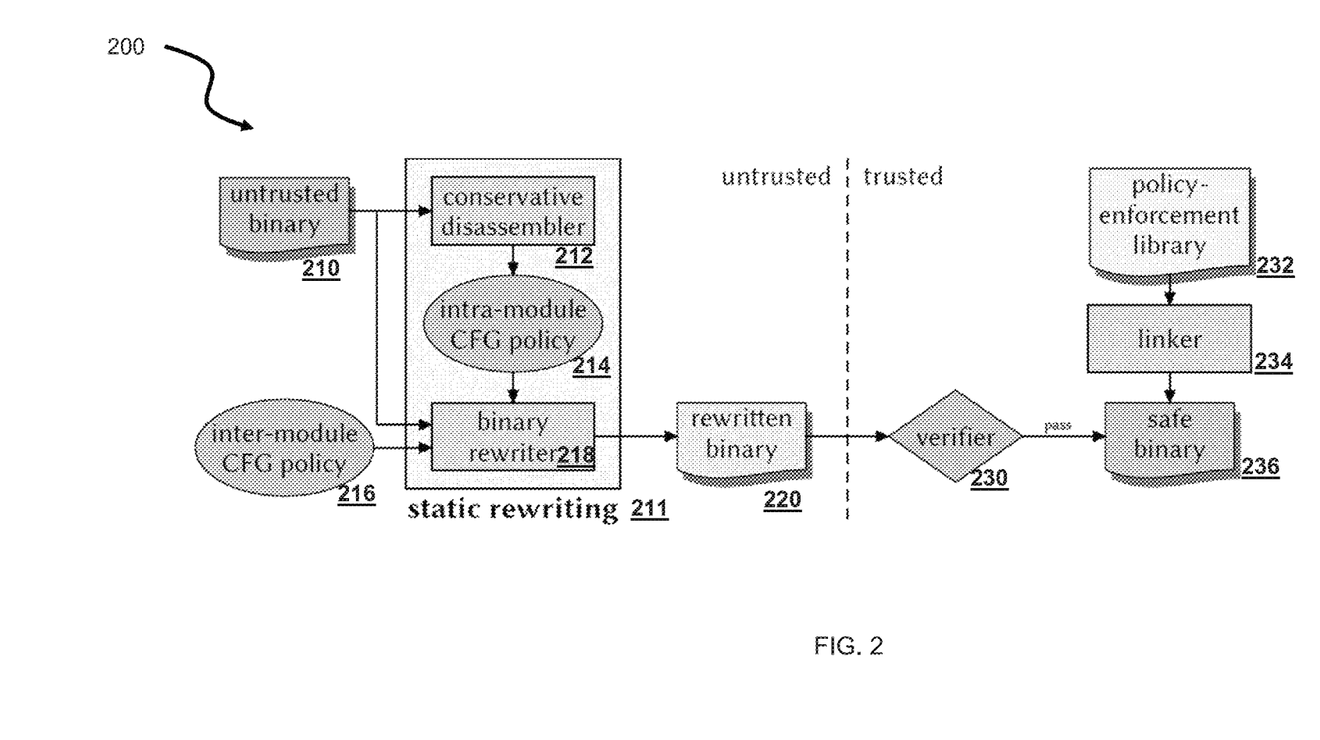
FIG. 2 illustrates a diagram of an example process for rewriting untrusted module binaries.

FIG. 2 illustrates a diagram of an example binary rewrite process 200. For example, process 200 is similar to the retrofitting algorithm disclosed in U.S. Pat. No. 9,202,044 B2, FIG. 5. Untrusted native code binaries 210 are first disassembled 212 to obtain a conservative control flow graph (CFG) policy 214. The policy 214 dictates that the control flow paths statically uncovered and analyzed by the disassembly process 212 are permissible. In addition inter-module CFG policies 216 are determined. A binary rewriting module 218 then injects guard code at control flow transfer sites to constrain flows to the CFG 214 and 216 policies. The parsing disassembler 212, CFG analysis 214, and binary rewriter 218 are part of the static rewriting 211 process. The output of process 211 is a rewritten binary module 220.

A separate verifier module 230 independently validates control flow safety of the newly rewritten binary code. This shifts the un-validated rewriting implementation out of the trusted computing base. Turning to the trusted module, the policy enforcement library 232 of the trusted module is modified with the OFI extensions needed to interact with the OFI library module. No change to the disassembly, rewrite, verification, or linking stages is typically needed. The linker process 234 needs to be re-executed to incorporate the OFI modifications in the policy enforcement library. The output of the linking step is a safe binary 236.

Figure 3:
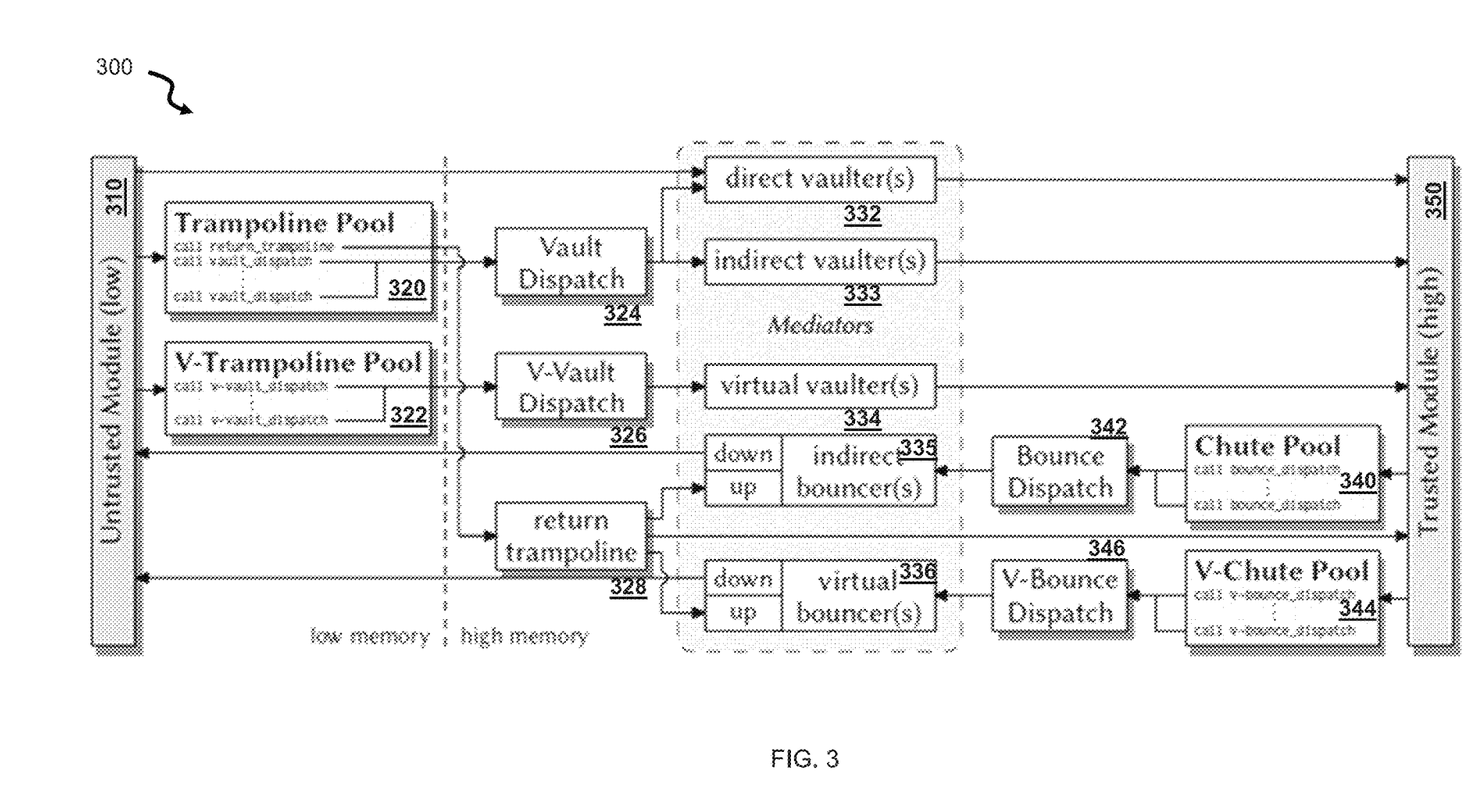
FIG. 3 illustrates a diagram of an example OFI application runtime process.

FIG. 3 illustrates a diagram of an example cross module OFI control flow process 300. OFI process 300 demonstrates how a programmatic call flows from one type of module to the other and how the return programmatic call can be handled. The OFI process 300 includes an untrusted module 310, a trusted module 350, a trampoline pool 320, a v-trampoline pool 322, a vault dispatcher 324, a virtual vault (v-vault) dispatcher 326, a return trampoline dispatcher 328, a direct vaulter 332, an indirect vaulter 333, a v-vaulter 334, an indirect bouncer 335, a v-bouncer 336, a bounce dispatcher 342, a v-bounce dispatcher 346, a chute pool 340, and a v-chute pool 344. The vault dispatcher 324 handles the communications between the trampoline pool 320 and the direct 332 and indirect 333 vaulters. The v-vault dispatcher 326 handles the communications between the v-trampoline pool 322 and the v-vaulter 334.

These listed components are a demonstration of the functionality used in the disclosure. These components can exist in a variety of quantities and the represented functionality can be combined or separated into various components. For example, the vault dispatcher 324 and the v-vault dispatcher 326 can be combined into a single software application and can further be included in the software application of the trampoline pool 320. In another example, the trampoline pool 320 and the chute pool 340 can be handled by the same software application with the addition of a parameter indicating the originator of the programmatic call. In addition, these components can be executed on the same or different computing systems. For example, the untrusted module 310 can exist and execute on one physical or virtual computing system and the trusted module 350 can exist and execute on a second physical or virtual computing system. The computing system can be of various physical or virtual systems capable of executing the software applications, for example, a virtual cloud environment, a laptop, computer server, electronic tablet, smartphone, or other devices and environments.

When the untrusted module 310 attempts to call a function in the trusted module 350, such as a shared object, three different paths can be followed depending on the addressing of the function. If the address is a direct address call, for example, an immediate address (i.e., a code address that is hard wired at the assembly code level), the programmatic control can be directed directly to the mediator library direct vaulter 332. If there is an indirect address (i.e., an address that points to pointers in code) then the programmatic control can be directed to trampoline pool 320. If there is a set of virtual addresses, i.e. a table of pointers, then the programmatic control can be directed to v-trampoline pool 322.

Trampoline pool 324 can be directed to the vault dispatcher 324. V-trampoline pool 322 can be directed to the v-vault dispatcher 326. The respective dispatchers then call the appropriate vaulter within the mediator library. The vault dispatcher 324 can call into the direct vaulter 332 or the indirect vaulter 333. The v-vault dispatcher 326 can call into the v-vaulter 334. The respective dispatcher pops the return address pushed by the trampoline 320 or v-trampoline 322 pool to determine the index of the function being called, and consults the stack's this pointer to determine the object. Utilizing this information, the respective dispatcher selects and tail-calls the appropriate vaulter mediator. The respective vaulter proxies in-arguments, calls the trusted module's 350 implementation of the function, then proxies out-arguments, and returns to the caller (untrusted) module 310.

In the reverse direction, trusted module 350 calls into a chute pool 340 or a v-chute pool 344 that targets the respective bounce dispatch subroutine, i.e. bounce dispatch 342 and v-bounce dispatcher 346. The respective bounce dispatcher then dispatches control to the appropriate bouncer in the mediator library, i.e., indirect bouncer 335 and virtual bouncer 336. The down and up portions of the respective bounce mediators control the direction that the programmatic call is going. To increase the safety of the return of the untrusted callee to the trusted caller, which constitutes a control flow edge from untrusted code to a non-exported trusted address, which many CFI/SFI policies prohibit, the indirect bouncer 335 or v-bouncer 336 replaces the return address with the address of a special return trampoline 328 that returns control to the "up" portion of the respective bouncer implementation.

This approach generalizes to direct untrusted to trusted calls and indirect, i.e. non-virtual, untrusted to trusted calls, which are represented in process 300. Direct calls are statically identifiable by, source aware and source free, CFI/SFI and are therefore statically replaced with a direct call to a corresponding direct vaulter implementation. Indirect, inter-module calls dereference code pointers returned by the system's dynamic linking API, for example, dlsym( ) or GetProcAddress( ) on portable operating system interface (POSIX) based OSes or Windows based OSes, respectively. The OFI process redirects these to trampoline pool entries that dispatch appropriate indirect vaulters. Dynamic linking can also return pointers to statically linked functions, in which case the dispatcher targets a direct vaulter.

Figure 4:
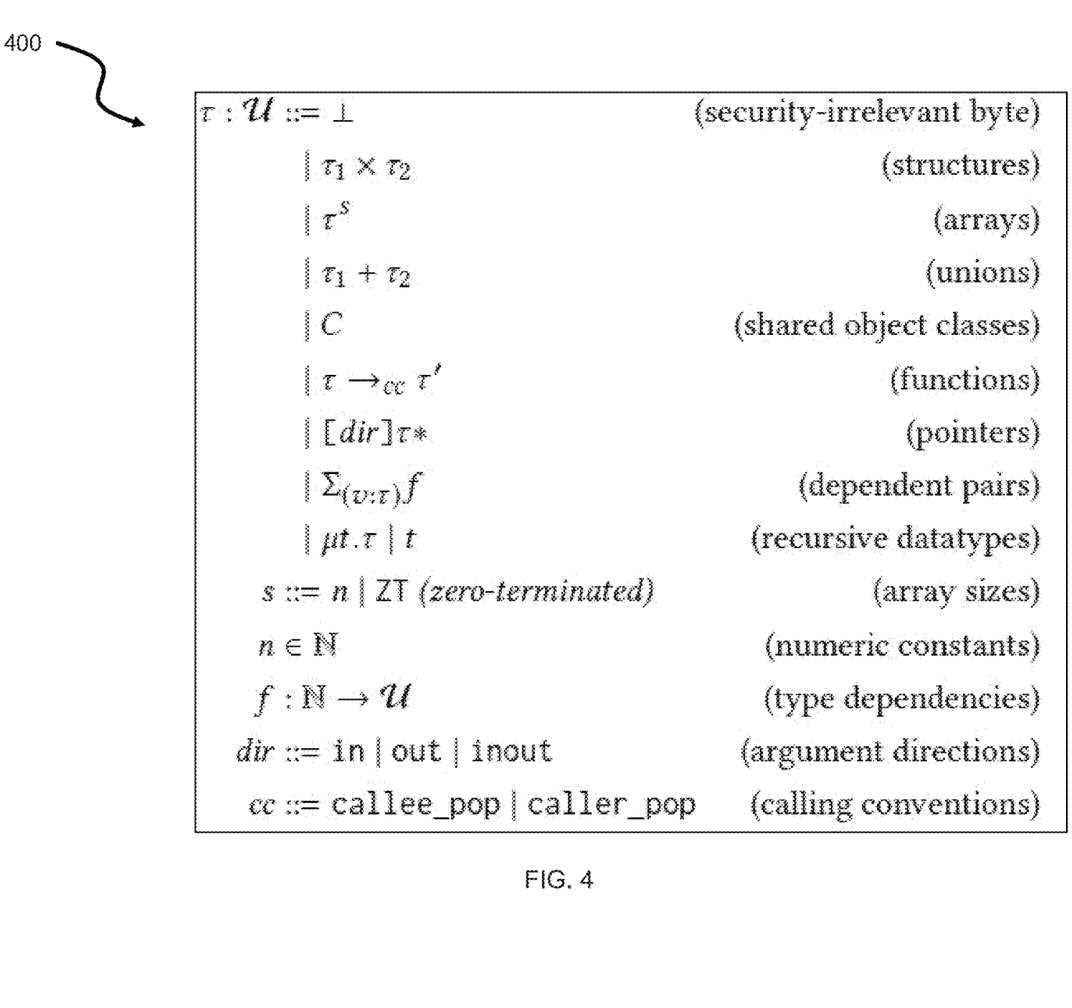
FIG. 4 illustrates a table of an example type system for expressing OFI contracts.

FIG. 4 illustrates a table of an example type system 400 for expressing CFI/SFI obligations as OFI contracts. Type system 400 defines OFI contracts as a core subset of the type system used by interface description languages, such as MIDL and CORBA IDL, for component communication. Interface methods have types $\tau \rightarrow_{cc} \tau'$, which denote functions from an argument list of type $\tau$ to a return value of type $\tau'$. Calling convention annotation cc is used by OFI processes to preserve and secure the call stack during calls. Classes, structures, and function argument lists are encoded as tuples $\tau_1 \times \tau_2 \times \ldots \times \tau_n$, which denote structures having n fields of types $\tau_1, \ldots, \tau_n$, respectively. For convenience, named classes are here written as named types C in lieu of writing out their recursive type signatures. Static length arrays and zero-terminated strings have repetition types $\tau^n$ and $\tau^{ZT}$, respectively. Pointer arguments whose referents are provided by callers (resp. callees) have type [in]t* (resp. [out]τ*). Those with a caller supplied referent that is replaced by the callee before returning use bidirectional annotation [inout]. Self or mutually referential types are denoted by $\mu t \cdot \tau$, where $\tau$ is a type that uses type variable t for recursive reference.

For example, Listing 3's GetResult method has type GetResult:([iN]$C_{IFD*}$×[out]$C_{ISI*}$)→callee_pop $\perp^4$ where $C_{IFD}$ and $C_{ISI}$ are the types of the IFileDialog and IShellItem interfaces. This type reveals that a correct vaulter for GetResult must replace the first stack argument (i.e., the this pointer) with a floor proxy of type $\lfloor C_{IFD*} \rfloor$ before invoking the trusted callee, and then replace the second stack argument with a ceiling proxy of type $\lceil C_{ISI} \rceil$ before returning to the untrusted caller. In addition to the types found in the C language, there is a need for dependent pair types $\Sigma_{(v:\tau)} f$ in order to express some API method contracts. Values with such types consist of a field V of some numeric type τ, followed by a second field of type 4V). Function f derives the type of the second field from value V. For example, the contract of QueryInterface is expressible as:

QueryInterface: [in]$C_{IFD*}$×$\Sigma_{(iid:\perp}{}^{16})$
(iid=⟨iid1⟩ ⇒[out]$C_{1*}$|iid=⟨iid$_2$⟩ [out]
$C_{2*}$| . . . )→callee_pop$\perp^4$ This type indicates that the second stack argument is a 16-byte (128-bit) integer that identifies the type of the third stack argument. If the former equals ⟨iid$_1$⟩, then the latter has type [out]$C_1$*, and so on.

There is a fairly natural translation from interface specifications expressed in C/C++ IDLs, such as source code annotation language (SAL), to this type system. Products (x), repetition ($\tau^s$), sums (+), classes (C), functions (→), pointers (*), and datatype recursion (μ) are expressed in C++ datatype definitions as structures, arrays, unions, shared classes, function pointers/references, and type self-reference, or mutual self-reference, respectively. SAL annotations additionally specify argument directions and array bounds dependencies. Special dependencies involving class and interface identifiers, such as those in QueryInterface s contract, can be gleaned from the system maintained list of registered classes and interfaces.

Figure 5:
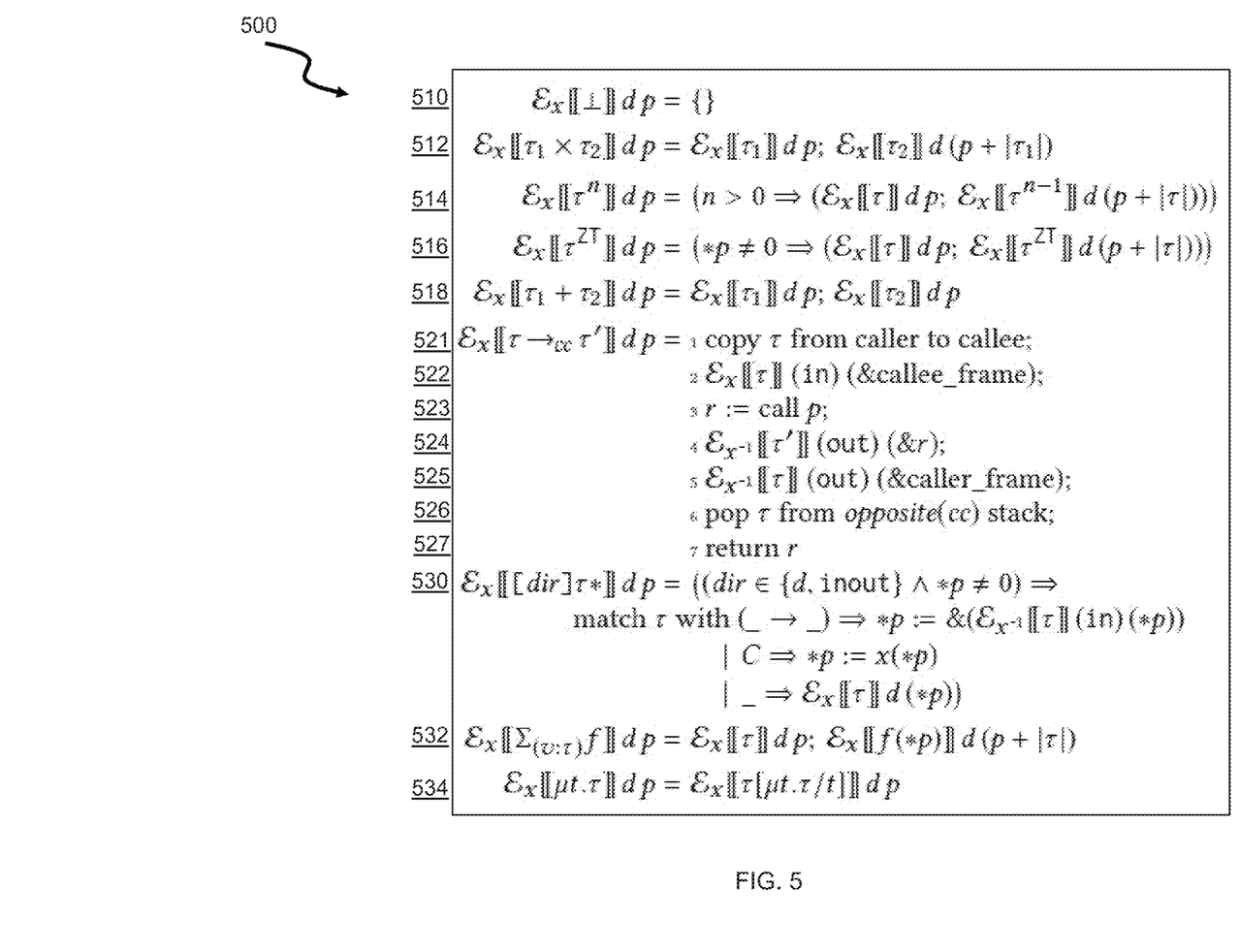
FIG. 5 illustrates a table of an example algorithm for synthesizing OFI library module code.

FIG. 5 illustrates a table 500 of an example algorithm for synthesizing OFI library module code for generating mediator enforcement of OFI contracts. OFI contract types can be automatically translated into effective procedures for enforcing the contracts they denote, i.e., creating mediator libraries. Table 500 demonstrates some of the translation algorithms utilizing the style of a denotational semantics where $\varepsilon_x x[[\tau]]dp$ yields a procedure for enforcing the contract denoted by type $\tau$ with proxying function $X \in \{\lfloor \bullet \rfloor, \lceil \bullet \rceil\}$ in call-direction $d \in \{in, out\}$ on the bytes at address p.

For example, $\varepsilon_{\lfloor \bullet \rfloor}[[\tau_{GetResult}]](in)(\&GetResult)$ yields one possible implementation of GetResult_vaulter, as demonstrated in the equation GetResult:([in]$C_{IFD*} \times$[out] $C_{ISI*}$)→callee_pop $\perp^4$. The denotational semantics first describe a process that copies the caller stack frame T to a secure callee-owned stack (521). Then the semantics describe an enforcement of the in contract for $\tau$ (522), which replaces the argument of type $C_{IFD}$ with a proxy of type $\lfloor C_{IFD} \rfloor$, before invoking GetResult (523). Upon return, the out contracts for return type $\tau'$ and frame T are enforced (524 and 525). In this case, return type $\tau'=\perp^4$ is security irrelevant, and the out contract for T demands replacing stack object $C_{ISI}$ with proxy $\lceil C_{ISI} \rceil$. Finally, the frame of the participant, either the caller or callee, that did not already clean its stack is popped (526), and control returns to the caller (527).

Each contract enforcement (522, 524, and 525) entails recursively parsing the binary datatypes as described in FIG. 4 and substituting code pointers with pointers to mediators that enforce the proper contracts. Structure (512), array (514) and (516), and union (518) contracts are enforced by recursively enforcing the contracts of their member types. Function pointer (line 2 of 530) contracts are enforced by lazily replacing them with mediator pointers, shared class (line 3 of 530) contracts are enforced by proxying, and other pointer (line 4 of 530) contracts are enforced by dereferencing the pointer and enforcing the pointee's contract. Dependent pairs (532) are enforced by resolving the dependency to obtain the appropriate contract for the next datum. Recursive types (534) are enforced as a loop that lazily unrolls the type equi-recursively. Algorithmic contract 510 represents an empty set of actions in response to seeing a security irrelevant value.

Figure 6:
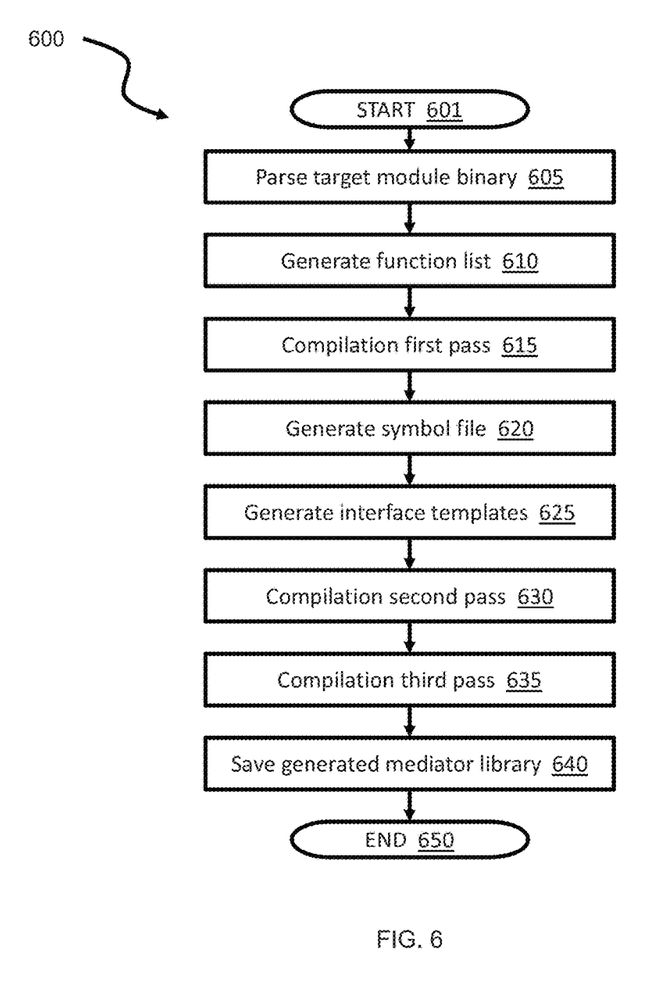
FIG. 6 illustrates a flow diagram of an example method for generating OFI library modules, i.e. mediator library, in an untrusted application.

FIG. 6 illustrates a diagram of an example method 600 for implementing an OFI interface process. Method 600 demonstrates an example method for automatically generating mediator code libraries for use by the OFI process at run time of an application. The method 600 begins at a step 601 and proceeds to a step 605. Step 605 identifies the target module binary(ies) to be analyzed by the process. The module binary can be part of an untrusted module. Step 605 also applies a parser, such as a PE parser, to the target module binary. A parser that is used can, if available, be able to evaluate the binary and provide some protection against incorrectly written, malformed, or malicious binary code.

Proceeding to a step 610, a list is generated from the exported function list that is the resultant of step 605. The generated function list can include the interface definitions for each function, as well as known guards on the interface parameters. Proceeding to a step 615, a first compilation is completed using the function list from step 610 and the available header files for the binary module. This example method 600 uses the term header files typically associated with C++. Since different programming languages can store the interface parameter description information in various ways, other types of files can be used as long as those files provide a description of the interfaces in the binary module.

Proceeding to a step 620, the resultant of the compilation from step 615 is utilized to generate a symbol file, such as a PDB file or debug file. In a step 625, a reflector tool, i.e. an application that analyzes the symbol file, parses the symbol file to output templates, for example, C++ templates, or another programming language's equivalent. These templates facilitate access to the static types of the binary module's structure and class members.

In a step 630, a second compilation is executed utilizing the binary module's header files, or the programming language's equivalent, and the template resultants from step 625. The output of step 630 is a mediator source code for the binary module, for example, the code to execute the vaulter and bouncer processes. Proceeding to a step 635, a third compilation is executed to compile the mediator source code into a mediator library that is capable of being executed during runtime operations of the binary module. In a step 640, the generated mediator library is saved. The method 600 continues and ends at a step 650.

Independently of and possibly in parallel to one or more of the steps of method 600, steps can be performed that are necessary to produce the binary code changes to the binary module to allow the binary module to interact with the mediator library rather than executing the function calls directly. The mediator library created by the method 600 can be loaded by a secured untrusted library when that modified program eventually executes.

Figure 7:
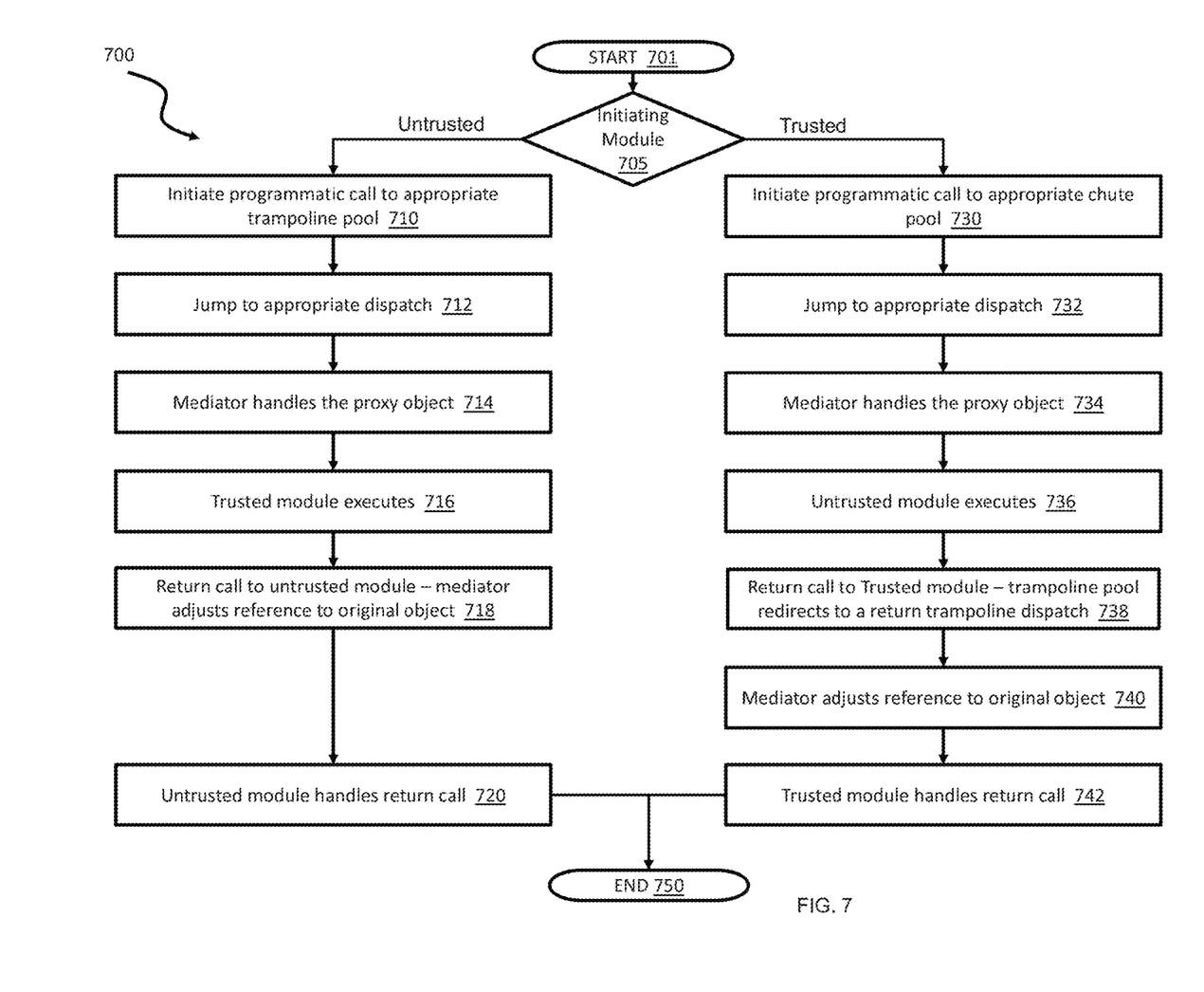
FIG. 7 illustrates a flow diagram of an example method for enforcing a mediator of OFI contracts at an application runtime.

FIG. 7 illustrates a diagram of an example method 700 for enforcing a mediator of OFI contracts through employing a proxy object. The method 700 begins at a step 701 and proceeds to a decision step 705. Decision step 705 is for purposes of describing the method and is not implemented in application code. In practice, the method would begin at a step 710 or a step 730, depending on the initiating module. In decision step 705, for the documented demonstration, the decision is related to which module is initiating the function call.

The function call can be initiated by an untrusted module. The untrusted module can be of various types of software applications. For this example, the untrusted module is considered part of a user interaction application, i.e. a module typically associated with a non-OS application. The function call can also be initiated by a trusted module. The trusted module can be of various types of software applications. For this example, the trusted module is considered part of the signed and secured OS application, i.e., not associated with a user run application. The terms trusted and untrusted are descriptive only and do not necessarily reflect on the actual security of the respective modules.

Following the Untrusted path from decision step 705, the method 700 proceeds to a step 710 where an untrusted module is executing a function call where the target of the call is located in a trusted module. Step 710 directs the function call to an appropriate trampoline pool. If a table of pointers to various proxy objects exists, then the v-trampoline pool is used. Otherwise, the trampoline pool is used. In some aspects, the untrusted module can call the trusted module directly, if the direct address is known. In this aspect, the trampoline pools are bypassed.

Proceeding to a step 712, the programmatic call is directed from the appropriate trampoline pool to the respective vault dispatcher. The vault dispatcher identifies the appropriate proxy object, as defined in the mediator library, to use for the object being passed in the programmatic call. Step 712 then initiates the programmatic call to the identified proxy object. Step 712 can be bypassed in some aspects, such as if the untrusted module attempts to call the trusted module through a direct address.

Proceeding to a step 714, the mediator library handles the transformation of the original object to the proxy object. Using the new proxy object, step 714 then proceeds to a step 716 where the trusted module executes utilizing the proxy object. In a step 718, the trusted module returns programmatic control to the untrusted module. Step 718, occurring in the mediator library, can deference the proxy object and return the original object to the untrusted module. In a step 720, the untrusted module then handles the programmatic return call. The method 700 ends at a step 750.

Following the Trusted path from decision step 705, the method 700 proceeds to a step 730. This trusted path is similar to the untrusted path described above. Here, a trusted module is executing a function call where the target of the call is located in an untrusted module. Step 730 directs the function call to an appropriate chute pool. If a table of pointers to various proxy objects exists, then the v-chute pool is used. Otherwise, the chute pool is used.

Proceeding to a step 732, the programmatic call is directed from the appropriate chute pool to the respective bounce dispatcher. The bounce dispatcher identifies the appropriate proxy object, as defined in the mediator library, to use for the object being passed in the programmatic call. Step 732 then initiates the programmatic call to the identified proxy object.

Proceeding to a step 734, the mediator library handles the transformation of the original object to the proxy object. In addition, step 734 saves the return address of the programmatic call to a return trampoline. This enables the untrusted module to return programmatic control to the trusted module without raising issues with CFI/SFI guards. Using the new proxy object, step 734 then proceeds to a step 736 where the untrusted module executes utilizing the proxy object. In a step 738, the untrusted module returns programmatic control to the trusted module utilizing the trampoline pool through to the return trampoline dispatcher. The v-trampoline pool is not used in this scenario. In a step 740, occurring in the mediator library, the proxy object is dereferenced and the original object is returned to the trusted module. In a step 742, the trusted module handles the programmatic return call. The method 700 then ends at the step 750.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps can be present, or utilized, or combined with other elements, components, or steps that are not expressly referenced.

Those skilled in the art to which this application relates will appreciate that other and further additions, deletions, substitutions and modifications can be made to the described aspects. It is also to be understood that the terminology used herein is for the purpose of describing particular aspects only, and is not intended to be limiting, since the scope of the disclosure will be limited only by the claims.

Unless defined otherwise, all technical and scientific terms used herein have the same meaning as commonly understood by one of ordinary skill in the art to which this disclosure belongs. Although various methods and materials similar or equivalent to those described herein can also be used in the practice or testing of the present disclosure, a limited quantity of the exemplary methods and materials are described herein.

It is noted that as used herein and in the appended claims, the singular forms "a", "an", and "the" include plural referents unless the context clearly dictates otherwise.

A portion of the above-described apparatus, systems or methods may be embodied in or performed by various, such as conventional, digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Aspects and elements disclosed herein provide technological improvements in the operation of object-like software applications by, for example, employing an OFI library module for software security between untrusted and trusted modules. The disclosure can advantageously employ an address exchanged between the trusted and untrusted modules for the improved security. The various aspects and elements disclosed provide an improvement to computer functionality by providing increased security for object-like software applications or modules.

Aspects disclosed herein include:

A. A method for improving software security for an object-like software application, including redirecting a programmatic call between untrusted and trusted software modules, wherein the programmatic call is from a calling module and is redirected to an OFI library module; substituting, from the programmatic call, a proxy object for a passed object, wherein the proxy object utilizes OFI methods from the OFI library module; utilizing the proxy object in the programmatic call; and dereferencing the proxy object on the programmatic call return path to the calling module.

B. A method of initiating OFI, including initiating an OFI process with respect to an untrusted application; modifying the untrusted application's binary code to include OFI handling for object-like programmatic calls between the untrusted application and a trusted application; and creating an OFI module library relating to the untrusted application.

C. A non-transitory computer readable medium storing instructions that, when executed by a data processing apparatus such as a processor or a computer, perform operations including intercepting an object-like programmatic call between two software modules initiated by a first software module; substituting a passed object from the call with a proxy object, wherein the proxy object utilizes OFI processes; and dereferencing the proxy object on a return programmatic path to the first software module.

Each of aspects A, B, and C can have one or more of the following additional elements in combination:

Element 1: wherein the proxy object utilizes a vtable. Element 2: wherein the vtable uses no or limited data values. Element 3: wherein the vtable supports inheritance. Element 4: wherein the proxy object can subtype other proxy objects utilizing the vtable. Element 5: wherein the vtable is implemented as a read-only physical page of memory. Element 6: wherein the physical page of memory is allocated to one or more virtual memory pages. Element 7: wherein more than one proxy object can be created. Element 8: wherein multiple proxy objects utilize the same vtable. Element 9: wherein the proxy object utilizes an object subtype of the passed object. Element 10: wherein the proxy object enforces a type based contract on programmatic interfaces. Element 11: wherein the programmatic interfaces relate to methods residing in a software module. Element 12: wherein the proxy object stores data in a set of CPU registers. Element 13: wherein the proxy object stores data in a secure thread local storage space. Element 14: wherein the OFI library module methods are compatible with one or more of control flow integrity and software fault isolation software security protocols. Element 15: wherein the calling module is an untrusted module. Element 16: wherein the calling module is a trusted module. Element 17: wherein the binary code of the untrusted module is modified to include OFI redirection processes. Element 18: wherein the redirection processes is one or more of a direct vaulter flow, an indirect vaulter flow, and a virtual vaulter flow. Element 19: storing a return address of the programmatic call in a return trampoline. Element 20: utilizing the return trampoline to return to the calling module. Element 21: initiating an OFI process with respect to an untrusted application. Element 22: modifying the untrusted application's binary code to include OFI handling for object-like programmatic calls between the untrusted application and a trusted application. Element 23: creating an OFI library module relating to the untrusted application. Element 24: evaluating a type based contract by recursively parsing an interface's datatypes of the programmatic calls. Element 25: substituting code pointers from the programmatic calls with code pointers from a proxy object to enforce the type based contract. Element 26: generating the OFI library module, employing a multi-pass process, utilizing at least one of interface documenting header files, function prototypes, function structures, function object types, and symbol files. Element 27: reflecting through the symbol files to generate function templates wherein the function templates are utilized in the multi-pass process. Element 28: analyzing includes evaluating a type based contract by recursively parsing an interface's datatypes of the programmatic calls.

What is claimed is:

1. A method for improving software security for an object-like software application, comprising:
   redirecting a programmatic call between untrusted and trusted software modules, wherein said programmatic call is from a calling module and is redirected to an object flow integrity (OFI) library module;
   substituting, from said programmatic call, a proxy object for a passed object, wherein said proxy object utilizes OFI methods from said OFI library module;
   utilizing said proxy object in said programmatic call; and
   dereferencing said proxy object on said programmatic call return path to said calling module.

2. The method as recited in claim 1, wherein said proxy object utilizes a virtual method table (vtable) with limited data.

3. The method as recited in claim 2, wherein said vtable supports inheritance and said proxy object can subtype other proxy objects utilizing said vtable.

4. The method as recited in claim 2, wherein the said vtable is implemented as a read-only physical page of memory.

5. The method as recited in claim 4, wherein said physical page of memory is allocated to one or more virtual memory pages.

6. The method as recited in claim 1, wherein more than one proxy object has been created and said proxy objects utilize the same vtable.

7. The method as recited in claim 1, wherein said proxy object utilizes an object subtype of said passed object.

8. The method as recited in claim 1, wherein said proxy object enforces a type based contract on programmatic interfaces where said interfaces relate to methods residing in respective of said software modules.

9. The method as recited in claim 1, wherein said proxy object stores data in a set of CPU registers or secure thread local storage space.

10. The method as recited in claim 1, wherein said OFI module methods are compatible with one or more of control flow integrity and software fault isolation software security protocols.

11. The method as recited in claim 1, wherein said calling module is an untrusted module and further comprising:
   modifying a binary code file of said untrusted module to include OFI redirection processes, wherein said redirection processes is one or more of a direct vaulter flow, an indirect vaulter flow, and a virtual vaulter flow.

12. The method as recited in claim 1, wherein said calling module is a trusted module and further comprising:
   storing a return address of said programmatic call in a return trampoline; and
   utilizing said return trampoline to return to said calling module.

13. A method of initiating object flow integrity (OFI), comprising:
   initiating an OFI process with respect to an untrusted application;
   modifying said untrusted application's binary code to include OFI handling for object-like programmatic calls between said untrusted application and a trusted application; and
   creating an OFI library module library relating to said untrusted application.

14. The method as recited in claim 13, further comprising:
   evaluating a type based contract by recursively parsing an interface's datatypes of said programmatic calls; and
   substituting code pointers from said programmatic calls with code pointers from a proxy object to enforce said type based contract.

15. The method as recited in claim 13, further comprising:
   generating said OFI library module, employing a multi-pass process, utilizing at least one of interface documenting header files, function prototypes, function structures, function object types, and symbol files.

16. The method as recited in claim 15, further comprising:
   reflecting through said symbol files to generate function templates wherein said function templates are utilized in said multi-pass process.

17. A non-transitory computer readable medium storing instructions that, when executed by a data processing apparatus, perform operations comprising:

intercepting an object-like programmatic call between two software modules initiated by a first software module;

substituting a passed object from said call with a proxy object, wherein said proxy object utilizes object integrity flow (OFI) processes; and dereferencing said proxy object on a return programmatic path to said first software module.

18. The non-transitory computer readable medium as recited in claim 17, wherein the OFI processes utilize a virtual method table (vtable) implemented as a read-only physical page of memory.

19. The non-transitory computer readable medium as recited in claim 18, wherein more than one proxy object has been created and said proxy objects utilize the same vtable.

20. The non-transitory computer readable medium as recited in claim 17, wherein said proxy object enforces a type based contract on programmatic interfaces where said interfaces relate to methods included in said first software module.

21. The non-transitory computer readable medium as recited in claim 17, wherein said OFI processes are compatible with one or more of control flow integrity and software fault isolation software security protocols.

22. The non-transitory computer readable medium as recited in claim 17, further comprising:

analyzing an untrusted module to collect method and interface parameters;

generating an OFI library module code utilizing said collected parameters; and modifying said untrusted module's binary code to redirect said programmatic call to said OFI library module for said programmatic calls between said untrusted module and a trusted module.

23. The non-transitory computer readable medium as recited in claim 22, wherein said analyzing includes evaluating a type based contract by recursively parsing an interface's datatypes of said programmatic calls.

\* \* \* \* \*

UNITED STATES PATENT AND TRADEMARK OFFICE
CERTIFICATE OF CORRECTION

PATENT NO. : 10,656,885 B2  
APPLICATION NO. : 16/173358  
DATED : May 19, 2020  
INVENTOR(S) : Kevin W. Hamlen Page 1 of 1

It is certified that error appears in the above-identified patent and that said Letters Patent is hereby corrected as shown below:

In the Specification

In Column 6, Line 34, after --that satisfies--, delete "$C_1 <: C_0 \Rightarrow (\lfloor C_1 \rfloor <: \lfloor C_0 \rfloor) \wedge (\lceil C_1 \rceil <: \lfloor C_0 \rfloor)$", and insert -- $C_1 <: C_0 \Rightarrow (\lfloor C_1 \rfloor <: \lfloor C_0 \rfloor) \wedge (\lceil C_1 \rceil <: \lceil C_0 \rceil)$ --

In Column 10, Line 47, after --3-2--, delete "01", and insert -- o1 --

In Column 10, Line 53, after --GetDisplayName--, delete "(. . .)", and insert -- (. . .); --

In Column 15, Line 5, after --semantics where--, delete "$\varepsilon_x X[[\tau]]dp$", and insert -- $\varepsilon_x[[\tau]]dp$ --

Signed and Sealed this  
Fourteenth Day of July, 2020

Andrei Iancu  
*Director of the United States Patent and Trademark Office*